United States Patent [19]

Gunesin et al.

[11] Patent Number: 4,871,814

[45] Date of Patent: Oct. 3, 1989

[54] HIGH IMPACT, HIGHLY TRANSPARENT LINEAR STYRENE-DIENE BLOCK COPOLYMERS WITH FIVE OR MORE BLOCKS AND THEIR PREPARATIONS BY ANIONIC DISPERSION POLYMERIZATION

[75] Inventors: Binnur Z. Gunesin, New York, N.Y.; Paul A. Pindris, Red Bank; Frederick C. Schwab, Metuchen, both of N.J.

[73] Assignee: Mobil Oil Corporation, New York, N.Y.

[21] Appl. No.: 65,658

[22] Filed: Jun. 22, 1987

Related U.S. Application Data

[62] Division of Ser. No. 901,506, Aug. 28, 1986, abandoned.

[51] Int. Cl.4 ............................................. C08F 297/04
[52] U.S. Cl. ...................................... 525/314; 525/89; 525/250; 525/252
[58] Field of Search ............... 525/250, 314, 244, 252, 525/271

[56] References Cited

U.S. PATENT DOCUMENTS

| | | |
|---|---|---|
| 3,770,712 | 11/1973 | Schwab . |
| 4,098,980 | 7/1978 | Markle et al. .......................... 525/99 |
| 4,220,738 | 9/1980 | Miki et al. ............................ 525/250 |
| 4,386,125 | 5/1983 | Shiraki et al. ....................... 525/314 |
| 4,530,966 | 7/1985 | Shiraki et al. ....................... 525/314 |

FOREIGN PATENT DOCUMENTS 46-3990  1/1971  Japan .................................. 525/314

Primary Examiner—Wilbert J. Briggs, Sr.
Attorney, Agent, or Firm—Alexander J. McKillop; Charles J. Speciale; Stanislaus Aksman

[57] ABSTRACT

High molecular weight linear block copolymers containing 5 or more alternating blocks of (A) polymerized styrene or alkyl substituted styrene units, and (B) polymerized conjugated diene units, terminated by (A) units, are prepared by anionic dispersion polymerization to give clear polymers having excellent physical properties.

26 Claims, No Drawings

HIGH IMPACT, HIGHLY TRANSPARENT LINEAR STYRENE-DIENE BLOCK COPOLYMERS WITH FIVE OR MORE BLOCKS AND THEIR PREPARATIONS BY ANIONIC DISPERSION POLYMERIZATION

This is a divisional of application Ser. No. 901,506, filed on Aug. 28, 1986, now abandoned.

BACKGROUND OF THE INVENTION

Although there has been considerable development in styrenic polymers, inexpensive polymers using predominantly styrene that are transparent, glossy and which have high impact strength are still sought. Polystyrene, high impact polystyrene, radial block copolymers, and the like, have been developed with various degrees of satisfaction to meet these requirements. But, polymer articles that have satisfactory clarity, such as those made from polystyrene polymers, are lacking in impact strength. Articles formed from blends of polymers, such as high impact polystyrene, often possess the satisfactory impact strength but lack sufficient clarity or other requisite properties. Blends of polystyrene with various compounds such as butadiene-styrene copolymers have been developed but as the impact strength of these plastic articles is increased there is also an increase in the opacity of the article and therefore they too have limited application.

High molecular weight block copolymers of butadiene and styrene containing six or more blocks in which the polymer has a branched (non-linear) configuration and referred to as radial polymers are known and are described in U.S. Pat. Nos. 3,639,517 and 4,091,053. In accordance with this invention, linear high molecular weight block copolymers of styrene and butadiene containing at least five blocks are prepared which have good optical clarity and other desirable physical properties.

SUMMARY OF THE INVENTION

High molecular weight linear block copolymers containing 5 or more alternating blocks of (A) polymerized styrene or alkyl substituted styrene units, and (B) polymerized conjugated diene units, terminated by (A) units are prepared by anionic dispersion polymerization to give clear polymers having excellent physical properties.

DETAILED DESCRIPTION OF THE INVENTION

The general process conditions suitable for preparation of the high molecular weight block copolymers of this invention are described in U.S. Pat. No. 3,770,712 which is incorporated herein by reference in its entirety. This patent and others described the slurry polymerization of monomers such as styrene and the preparation of various block copolymers which can include monomers such as conjugated dienes. However, to our knowledge, high molecular weight linear block copolymers containing at least five segments such as we describe are novel products.

This invention is applicable to block copolymers containing styrene or substituted styrenes as the A block. Suitable substituted styrenes include alkyl substituted styrenes, particularly methyl-substituted styrenes such as para-methylstyrene. Styrenes with polar groups such as chloride substituents cannot be used in anionic polymerization. One of more appropriate styrene monomers can be used. To B block comprising polymerized conjugated diene units can be formed from any anionically polymerizable conjugated diene, particularly butadiene, isoprene and dimethyl-butadiene.

Suitable anionic catalysts include butyl-lithium, sec-butyl-lithium and t-butyl-lithium. The concentration of the catalyst is generally from about $10^{-1}$ to $10^{-4}$ moles/100 g of monomer.

The reaction is conducted in an inert medium (also called a dispersing medium), which is a non-solvent for the polymer, paraffinic or monoolefinic hydrocarbons having between about 4 and 7 carbon atoms. Aromatic hydrocarbons and polar solvents are not suitable. Examples of useful slurry media are butane, isobutane, pentane, isopentane, hexane, heptane, 2,2-dimethylbutane, butene, pentene, and petroleum ether.

The process of polymerization can be carried out at temperatures between 30° C. and about 100° C. It is contemplated that the reaction can be conducted under pressure with a solvent such as isobutane which is highly volatile at the reaction temperature. Such a highly volatile solvent and pressure reaction conditions are advantageous in separating the polymer particles from the slurry medium.

The polymeric dispersing agent which is used to maintain the polymer in suspension as it is formed is advantageously an A-B block copolymer containing blocks which are similar to or the same as the blocks in the copolymer being produced. A diblock polymer comprising styrene and butadiene blocks having a number average molecular weight of 140,000 and a styrene content of about 40% has been found to be suitable. The dispersing agent is generally present in amounts of about 0.1 to 5.0 weight percent of the monomers.

The linear block copolymers prepared in accordance with this invention have 5 or more (e.g., 5–10) alternating blocks of (A) units comprising polymerized styrene or substituted styrene and (B) units comprising polymerized conjugated diene units in which the terminal blocks are (A) blocks. Thus, copolymers containing 5 blocks have the configuration A-B-A-B-A. Block copolymers containing at least about 70 weight percent of the A (styrenic) units are preferred. Thus, the B component generally comprises 10 to 30 weight percent of the block copolymer, and preferably 15 to 25 weight percent.

Because the process used for polymerization is a slurry process, the high viscosity of high molecular weight polymer imposes no constraint on the molecular weight of the block copolymers. Since high molecular weight polymers have advantageous physical properties, this invention is particularly concerned with polymers having the highest possible molecular weight so long as they are not too high in molecular weight to adversely effect processability. Accordingly, number average molecular weights in the range of 80,000 to 200,000 are contemplated and suitable copolymers in the molecular weight range of 100,000 to 150,000 have been prepared. Although the block copolymers have high molecular weights, high polymer concentrations relative to the solvent dispersing medium in the range of 20 weight percent to 40 weight percent of polymer are readily achieved. Using solution polymerization techniques, it would not be possible to obtain such high molecular weights at the high polymer concentrations possible with the process of this invention because the solution viscosities would be too high.

Block copolymers having excellent clarity and gloss, good elongation and impact strength are achievable with this invention. The polymers are useful, as such, in the preparation of containers such as clear cups, that can be coextruded with high impact polystyrene to achieve a glossy and clear surface, and they can be blended with polystyrene crystal to improve the physical properties of polystyrene. They exhibit better compatibility with polystyrene than many presently available materials used for this purpose. For example, the linear copolymer of this invention generally exhibits better compatibility with polystyrene than the branched radial block copolymers which are commercially available and those which are described in U.S. Pat. Nos. 3,639,517 and 4,091,053.

This invention is illustrated by the following non-limiting example.

EXAMPLE

In a 4-neck, one liter, round-bottom flask was placed:
250 ml Hexane
40 g Styrene
1.6 g Polymeric Dispersant* (previously dissolved in Styrene)
1.0 ml Tetrahydrofuran
0.2 ml 0.1% Phenanthroline in Toluene

*The polymeric dispersant is a diblock copolymer of styrene and butadiene having a number average molecular weight of about 140,000 and containing 40 weight percent styrene.

The reactor was purged for 30 minutes by bubbling $N_2$ through its contents. Residual impurities were titrated away and the reaction initiated with 0.5 ml of 1.4 M Sec-butyl lithium. The mixture was polymerized at ambient conditions, with stirring, overnight due to the lateness of initiation. (Previous work has shown that 1 hour is sufficient for this stage of the reaction.)

About 9 grams of butadiene distilled over butyl lithium was bubbled in through a double-tipped needle. The temperature was raised to 50° C. and maintained at that temperature for 3 hours. Using $N_2$ pressure, 12.5 g styrene mixed with 5.0 g hexane was added by a double-tipped needle. Impurities were titrated with butyl lithium and the reaction was allowed to proceed for 1 more hour at 50° C. After dropping the temperature to about 40° C., 10 g more butadiene was bubbled in, the temperature raised to 50° C. and the reaction run for 70 minutes. Then, 12.5 g styrene in 5 g hexane was added, as before, and reacted for 50 minutes. The reaction was terminated with 2 ml methanol and 10 ml of a 5% solution of Halby DLTDP (a phenolic antioxidant) in toluene was added to stabilize the mix.

Polymer equivalent to 70% of the monomer charges was collected containing 19 weight percent Rubber (by Iodine No.). The polymer comprised five blocks of styrene (S) and butadiene (B) in a linear arrangement (S-B-S-B-S) having a number average molecular weight of about 150,000.

Although the present invention has been described with preferred embodiments, it is to be understood that modifications and variations can be made without departing from the spirit and scope of this invention, as those skilled in the art will readily understand. Such modifications and variations are considered to be within the purview and scope of the appended claims.

We claim:

1. A process for preparing a linear block copolymer having a number average molecular weight of 80,000 to 200,000 containing 5 or more alternating blocks of (A) polymerized styrene or alkyl styrene units, and (B) polymerized conjugated diene units, terminated by the (A) units, and comprising at least about 70% by weight of the blocks (A) and not more than about 30% by weight of the blocks (B), which process comprises anionic dispersion polymerization in a paraffinic or monoolefin dispersing medium which is not a solvent for the polymer in the presence of a block copolymer dispersant containing A and B units which produces the linear block polymer at a concentration of 20 to 40 weight percent in the dispersing medium.

2. The process of claim 1 in which the A blocks consist of polymerized styrene units and the B blocks consist of polymerized butadiene units.

3. The process of claim 1 in which the linear block copolymer has the configuration A-B-A-B-A.

4. The process of claim 2 in which the linear block copolymer has the configuration A-B-A-B-A.

5. The process of claim 1 in which said linear block copolymer has a number average molecular weight of 100,000 to 150,000.

6. The process of claim 2 in which said linear block copolymer has a number average molecular weight of 100,000 to 150,000.

7. The process of claim 4 in which said linear block copolymer has a number average molecular weight of 100,000 to 150,000.

8. The process of claim 1 wherein the dispersing medium is isobutane.

9. The process of claim 7 wherein the dispersing medium is isobutane.

10. The process of claim 3 in which the A blocks consist of polymerized para-methylstyrene units.

11. The process of claim 10 in which the B blocks consist of polymerized butadiene units.

12. The process of claim 10 in which the B blocks consist of polymerized isoprene units.

13. The process of claim 10 in which the B blocks consist of dimethyl-butadiene units.

14. The process of claim 4 in which the dispersant is a diblock polymer comprising styrene and butadiene blocks having a number average molecular weight of 140,000 and a styrene content of about 40% by weight.

15. The process of claim 14 wherein the copolymer comprises 70 to 90% by weight of the polymerized styrene and 10 to 30% by weight of the polymerized butadiene.

16. The process of claim 15 wherein the copolymer comprises 75 to 85% by weight of the polymerized styrene and 15 to 25% by weight of the polymerized butadiene.

17. The process of claim 11 wherein the copolymer comprises 70 to 90% by weight of polymerized para-methylstyrene and 10 to 30% by weight of polymerized butadiene.

18. The process of claim 12 wherein the copolymer comprises 70 to 90% by weight of polymerized para-methylstyrene and 10 to 30% by weight of polymerized isoprene.

19. The process of claim 13 wherein the copolymer comprises 70 to 90% by weight of the polymerized para-methylstyrene and 10 to 30% by weight of the polymerized dimethyl-butadiene.

20. The process of claim 4 wherein the dispersing medium is hexane.

21. The process of claim 4 which is conducted at a temperature of between 30 and about 100° C.

22. The process of claim 21 which is conducted in the presence of an anionic catalyst, with the catalyst concentration being $10^{-1}$ to $10^{-4}$ moles/100 g of the monomers.

23. The process of claim 22 wherein the anionic catalyst is butyl-lithium, sec-butyl-lithium or t-butyl lithium.

24. The process of claim 23 wherein the dispersant is used in the amount of 0.1 to 5.0% by weight of the monomers.

25. The process of claim 24 wherein the block copolymer has 5-10 alternating blocks of (A) units and (B) units and is terminated by (A) units.

26. The process of claim 14 which is conducted in hexane as the dispersing medium, and in the presence of 0.5 ml of 1.4 M sec-butyl lithium to prepare a linear block copolymer containing polymerized styrene blocks (A) and polymerized butadiene blocks (B) to produce five block linear polymer having a number average molecular weight of about 150,000.

* * * * *

UNITED STATES PATENT AND TRADEMARK OFFICE
CERTIFICATE OF CORRECTION

PATENT NO. : 4,871,814

DATED : October 3, 1989

INVENTOR(S) : B.Z. Gunesin and P. A. Pindris and F.C. Schwab

It is certified that error appears in the above-identified patent and that said Letters Patent is hereby corrected as shown below:

Col. 1, line 8, after "of" insert --copending--.
Col. 2, line 1, change "of" to --or--.

Signed and Sealed this

Twenty-fifth Day of February, 1992

Attest:

HARRY F. MANBECK, JR.

*Attesting Officer*   *Commissioner of Patents and Trademarks*